United States Patent [19]

Worschech et al.

[11] Patent Number: 4,857,216

[45] Date of Patent: Aug. 15, 1989

[54] LUBRICANT SYSTEM FOR THE PROCESSING OF POLYVINYL CHLORIDE

[75] Inventors: Kurt Worschech; Peter Wedl, both of Loxstedt; Helmut Kachel, Bremerhaven; Guenter Schult, Loxstedt, all of Fed. Rep. of Germany

[73] Assignee: Neynaber Chemie GmbH, Loxstedt, Fed. Rep. of Germany

[21] Appl. No.: 95,286

[22] Filed: Sep. 10, 1987

[30] Foreign Application Priority Data

Sep. 10, 1986 [DE] Fed. Rep. of Germany ....... 3630778

[51] Int. Cl.$^4$ ......................................... C10M 129/74
[52] U.S. Cl. ..................................... 252/39; 252/56 S
[58] Field of Search .................................. 252/56 S, 39

[56] References Cited

U.S. PATENT DOCUMENTS

| | | | |
|---|---|---|---|
| 3,640,828 | 2/1972 | Brotz et al. | 252/56 S |
| 3,875,069 | 1/1975 | Worschech et al. | 252/56 S |
| 4,157,990 | 6/1979 | Lindner et al. | 252/56 S |
| 4,614,604 | 9/1986 | Helfert et al. | 252/56 S |

Primary Examiner—Jacqueline V. Howard
Attorney, Agent, or Firm—Ernest G. Szoke; Wayne C. Jaeschke; Henry E. Millson, Jr.

[57] ABSTRACT

A lubricant system for emulsion PVC of high K-value comprising:

I. at least one ester from each of sections (A) and (B):
  A. a neutral ester substantially free from hydroxyl and carboxyl groups which is:
    (1) a mixed ester of an aliphatic, cycloaliphatic, or aromatic $C_2$–$C_{22}$-dicarboxylic acid, or a mixture thereof; an aliphatic polyol containing from 2 to 6 hydroxyl groups; and an aliphatic $C_{12}$–$C_{30}$-monocarboxylic acid; or is
    (2) a fatty acid fatty alcohol ester containing a total of 36 to 44 carbon atoms; or is
    (3) a mixture of (1) and (2); and
  B. a partial ester containing on average at least one free hydroxyl or carboxyl polar group which is:
    (1) a mixed ester of an aliphatic, cycloaliphatic, or aromatic $C_2$–$C_{22}$-dicarboxylic acid, or a mixture thereof; an aliphatic polyol containing from 2 to 6 hydroxyl groups; and an aliphatic $C_{12}$–$C_{30}$-monocarboxylic acid; said ester containing on average at least one hydroxyl group per molecule of mixed ester; or is
    (2) an ester of an aliphatic, cycloaliphatic, or aromatic polycarboxylic acid or an aliphatic, cycloaliphatic or aromatic hydroxycarboxylic acid, or a mixture thereof; and an aliphatic $C_{12}$–$C_{24}$-monohydricalcohol; said ester containing on average at least one hydroxyl or carboxyl group per molecule of mixed ester; or is
    (3) a mixture of (1) and (2); and, optionally, II. a metal soap in an amount sufficient to lubricate or stabilize said PVC.

25 Claims, 1 Drawing Sheet

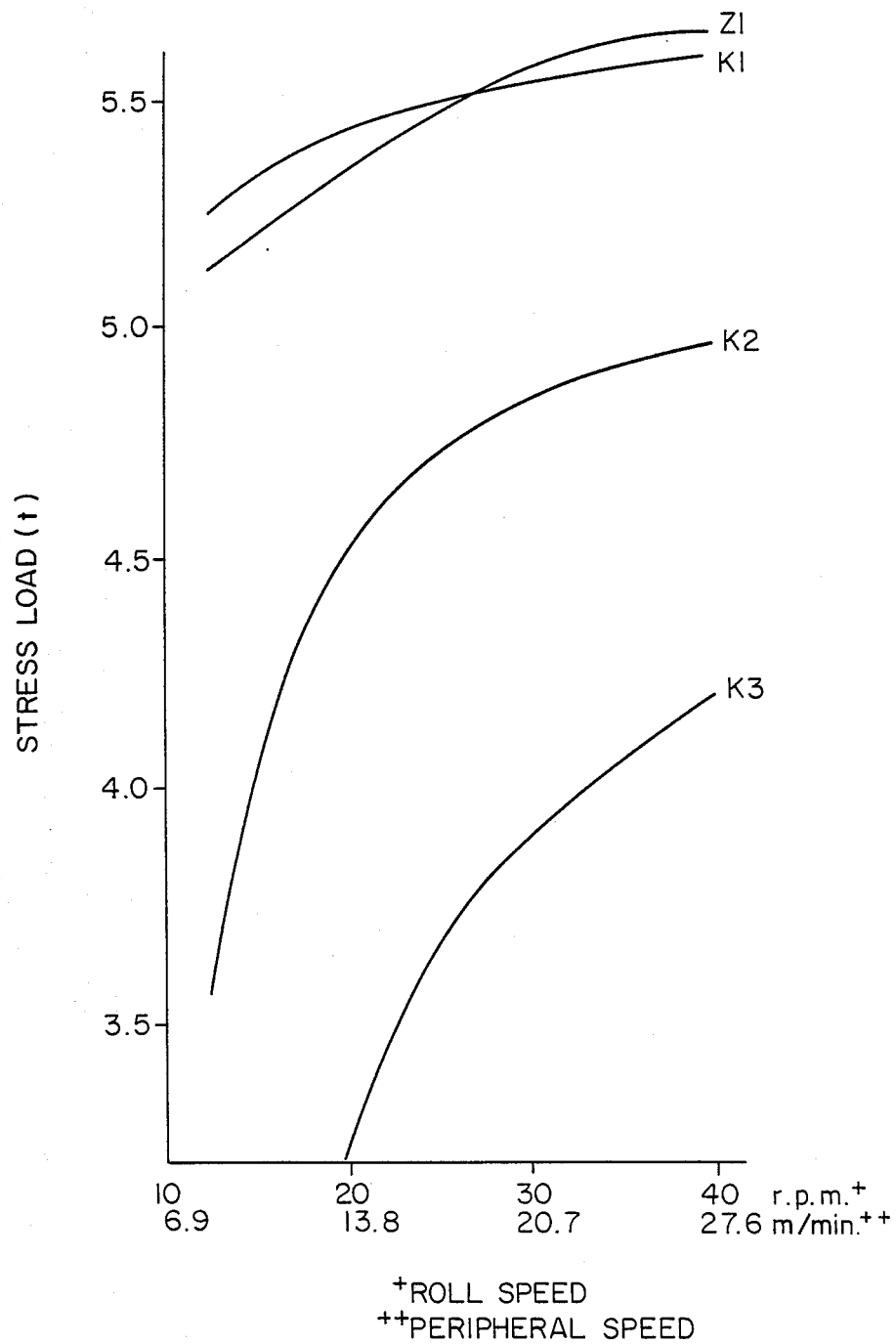

LUBRICANT SYSTEM FOR THE PROCESSING OF POLYVINYL CHLORIDE

BACKGROUND OF THE INVENTION

1. Field of the Art

Relatively large quantities of lubricants are used in the production of unplasticized films of emulsion PVC of high K-value, such as adhesive tape films. The lubricants are normally added in quantities of at least 4 phr (i.e., 4 parts by weight lubricant to 100 parts by weight synthetic resin) and more. Diphenyl thiourea or alkyl tin thioglycolates are generally used as stabilizers.

The choice of the lubricant is determined not only by lubricating effect and release effect of the lubricant, but most importantly by lubricant compatibility with the substrate. Only a few lubricants are compatible with rigid PVC in quantities of 4 to 5 or even 6 phr. In addition, the lubricants used with emulsion PVC also have to be compatible with the emulsifier used for polymerization and still present in the polymer.

2. Discussion of Related Art

The requirements of PVC production processes and the desired product properties are still best satisfied by lubricants based on montanic acid derivatives, such as montanic acid esters and partially hydrolyzed montan waxes. Unfortunately, the availability of montan waxes and derivatives thereof is limited and subject to certain fluctuations. For this reason alone, there is a need for lubricants to replace the montanic acid derivatives. In addition, the use of lubricants based on montanic acid derivatives is attended by the disadvantage that the formulations of the plastic molding compositions are totally inflexible in regard to the lubricant component, so that there is no possibility of influencing the lubrication behavior of the molding compositions or the color, transparency and wettability of the film by modifying the lubricant. For example, it is not possible to increase the aqueous solution wettability of rigid PVC films containing montanic acid derivatives as lubricants to the extent that aqueous primers may be used instead of the increasingly less desirable solvent-based primers presently employed.

Further, known lubricants based on montanic acid derivatives cannot readily be replaced by wax esters of analogous structure, i.e., fatty acid alcohol esters. Medium-chain wax esters are extremely compatible with rigid PVC in quantities of 1 to 2 phr; if that quantity is doubled, however, the esters become totally incompatible so that a PVC film formulation containing 4 phr cetyl palmitate, for example, is completely overlubricated.

BRIEF DESCRIPTION OF THE INVENTION

Accordingly, the present invention provides a new lubricant system for the processing of rigid PVC which is derived from a broader raw material base than is montanic acid. These new lubricant systems give results at least as good as those obtained with the known products, and, in addition, enable important properties of the molding compositions and the end PVC products to be influenced to a greater extent by modification of lubricant characteristics or variations in quantities used. The new lubricant system thus permits regulation of the rheological behavior of the PVC molding composition and also permits the end product to be modified by regulation of lubricant addition. The lubricant system comprises several individual components of graduated activity; by using a multicomponent mixture, it is possible to use the individual components in comparatively smaller quantities, so that the danger of oversaturation of the substrate with certain components to obtain adequate lubrication no longer exists or at least is greatly reduced.

DETAILED DESCRIPTION OF THE INVENTION

Other than in the operating examples, or where otherwise indicated, all numbers expressing quantities of ingredients or reaction conditions used herein are to be understood as modified in all instances by the term "about".

Accordingly, the present invention relates to a lubricant system for emulsion PVC of high K-value comprising I. at least one ester from each of sections (A) and (B):
   A. a neutral ester substantially free from hydroxyl and carboxyl groups which is:
      (1) a mixed ester of an aliphatic, cycloaliphatic, or aromatic $C_2$–$C_{22}$-dicarboxylic acid, or a mixture thereof; an aliphatic polyol containing from 2 to 6 hydroxyl groups; and an aliphatic $C_{12}$–$C_{30}$-monocarboxylic acid; or is
      (2) a fatty acid fatty alcohol ester containing a total of 36 to 44 carbon atoms; or is
      (3) a mixture of (1) and (2); and
   B. a partial ester containing on average at least one free hydroxyl or carboxyl polar group which is:
      (1) a mixed ester of an aliphatic, cycloaliphatic, or aromatic $C_2$–$C_{22}$-dicarboxylic acid, or a mixture thereof; an aliphatic polyol containing from 2 to 6 hydroxyl groups; and an aliphatic $C_{12}$–$C_{30}$-mono-carboxylic acid; said ester containing on average at least one free hydroxyl group per molecule of mixed ester; or is
      (2) an ester of an aliphatic, cycloaliphatic, or aromatic polycarboxylic acid or an aliphatic, cycloaliphatic or aromatic hydroxycarboxylic acid, or a mixture thereof; and an aliphatic $C_{12}$–$C_{24}$-monohydricalcohol; said ester containing on average at least one free hydroxyl or carboxyl group per molecule ester; or is
      (3) a mixture of (1) and (2); and, optionally,
II. a metal soap in an amount sufficient to lubricate or stabilize said PVC.

The lubricant system of the invention thus comprises a multicomponent mixture distinguished by the principal components (A)(1) and/or (A)(2) and (B)(1) and/or (B)(2) and, optionally, C.

The mixed esters defined in paragraph (A)(1) are synthesized from a mixture of dicarboxylic acids, polyols and long-chain carboxylic acids. In the production of these mixed esters, the ratio of hydroxyl groups to carboxyl groups in the starting materials and the degree of esterification are selected so that an end product substantially free from hydroxyl and carboxyl groups is obtained. The fatty acid fatty alsohol esters described in (A)(2) are also compounds which are substantially free from hydroxyl groups and craboxyl groups. The esters defined in (A)(1) and (A)(2) are soluble in and compatible with emulsion PVC, even in comparatively high concentrations. However, their compatability with the emulsifiers typically used in emulsion polymerization systems and still present in the polymers during production is limited. In addition, the esters (A)(1) and (A)(2)

have a certain hydrophobicizing effect when incorporated in large quantities.

According to the invention, the limitations of the compounds (A)(1) and (A)(2) are eliminated or at least largely avoided by incorporating the partial esters defined in (B)(1) and (B)(2) in the lubricant mixtures. In contrast to the neutral esters (A)(1) and (A)(2), the esters (B)(1) and (B)(2) contain additional polar groups in the form of free hydroxul and/or carboxyl groups. In the production of these esters, the molar ratio between the starting compounds and the esterification conditions is selected so that, on a statistical average, at least one free hydroxyl or carboxyl group, or combination thereof, is present per partial ester molecule in the resulting end products. The resulting mixtures exhibit good hydrophilicity and are accordingly satisfactorily wettable with aqueous solutionsk, and also have good compatibility with standard PVC emulsifiers as for example sodium alkyl sulfates and sodium alkyl sulfonates.

The ester combination (I) or (A)(1) and/or (A)(2) and (B)(1) and/or (B)(2) is optionally supplemented by the additional introduction of a highly compatible metal soap (II) which functions to counteract over-lubrication and which, in particular, also preferably increases the hydrophilicity of the lubricant system as a whole.

The neutral mixed esters defined in (A)(1) are known compounds which are conveniently obtained by standard methods of organic synthesis. Their use as a lubricant component in thermoplastic plastics, particularly in polyvinyl halides, is known, for example, from German patent application No. 1907 768 and from U.S. Pat. No. 3,875,069, to Worschech, et al, issued Apr. 1. 1975 and incorporated herein by reference. Preferred mixed esters are those in which the molar ratio of dicarboxylic acid to polyol to monocarboxylic acid is approximately $n-1:n:nm-2(n-1)$, where n is an integer of from 2 to 11 and m is the number of hydroxyl groups of the polyol, i.e., m is from 2 to 6. The value of n largely determines the average molecular weight of the mixed esters. The higher the values selected for n, the higher are the average molecular weights of the products. For the purposes of the invention, preferred values for n are from 1 to 8 and more especially from 1 to 4.

The neutral mixed esters (A)(1) are prepared by known esterification processes, for example by esterifying the monocarboxylic acid with the polyol in such a way that the partial ester obtained still contains one or more free hydroxyl groups which are then completely reacted with the dicarboxylic acid. However, some of the hydroxyl groups of the polyol may also be initially esterified with the dicarboxylic acid and the remaining free hydroxyl groups of the partial ester obtained subsequently completely reacted with the monocarboxylic acid. Providing the molar ratios indicated above are observed and the reaction conditions are selected so that complete esterification occurs, the resulting mixed esters are substantially free from carboxyl and hydroxyl groups, i.e. they have a hydroxyl and an acid number of from 8 to 6.

The following exemplary compounds are suitable as the $C_2-C_{22}$-dicarboxylic acid component for the production of the mixed esters (A)(1): oxalic acid, malonic acid, succinic acid, glutaric acid, adipic acid, pimelic acid, suberic acid, azelaic acid, subacic acid, nonane dicarboxylic acid, undecane dicarboxylic acid, eiocosane dicarboxylic acid, maleic acid, fumaric acid, citraconic acid, measconic acid, itaconic acid, cyclopropane dicarboxylic acid, cyclobutane dicarboxylic acid, cyclopentane dicarboxylic acid, camphor acid, hexahydrophthalic acid, phthalic acid, terephthalic acid, isophthalic acid, naphthalic acid, and diphenyl-o,o'-dicarboxylic acid.

Useful polyol components for preparing the mixed esters (A)(1) are $C_2-C_{10}$-aliphatic dihydric to hexahydric polyols, especially alkylene polyols containing 3 or 4 hydroxyl groups. The following exemplary compounds are suitable as the polyol component for the production of the mixed esters (A)(1): ethylene glycol, 1,2-propylene glycol, 1,3-propylene glycol, 1,4-butanediol, 2,3-butanediol, 1,5-pentanediol, 1,6-hexanediol, glycerol, trimethylolpropane, erythritol, pentaerythritol, dipentaerythritol, xylitol, mannitol, and sorbitol.

The following exemplary compounds are suitable as the monocarboxylic acid component for the production of the mixed esters (A)(1): lauric acid, myristic acid, palmitic acid, margaric acid, stearic acid, arachic acid, behenic acid, lignoceric acid, cerotic acid, montanic acid, oleic acid, elaidic acid, erucic acid, linoleic acid and linolenic acid, also mixtures of these acids, particularly those of the type which are obtainable from natural fats and oils in known manner.

Neutral mixed esters based on adipic acid, pentaerythritol and, in particular, long-chain aliphatic monocarboxylic acids, especially those containing from 20 to 24 carbon atoms, are particularly suitable as component (A)(1). Low molecular weight mixed esters of this type, which contain 2 moles polyol per mole adipic acid and the quantity of monocarboxylic acid required for complete esterification of the polyol hydroxyl grups, are particularly suitable. Thus, a preferred basic component (A)(1) is a mixed ester of 1 mole adipic acid, 2 moles pnetaerythritol and 6 moles behenic acid. More general information is found in U.S. Pat. No. 3,875,069, columns 5 and 6.

The fatty acid fatty alcohol esters (A)(2) are also known compounds. They are readily obtained by esterification of $C_{14}-C_{22}$-fatty acids with $C_{14}-C_{22}$-fatty alcohols, the saturated compounds being preferred. Examples of suitable starting fatty acids are myristic, palmitic, stearic and behenic acid. Examples of suitable starting fatty alcohols are myristyl, palmityl, stearyl and benhenyl alcohol. The fatty acid and fatty alcohol starting materials for these esters may be used either individually or in the form of their mixtures. In order more finely to graduate the properties of the lubricant mixtures, it can be of advantage to use fatty acid fatty alcohol esters of defined chain length, i.e., wherein the alkyl or alkenyl groups of the fatty alcohol and fatty acid reactants are the same, for example stearyl stearate or behenyl behenate.

The partial mixed esters (B)(1) are synthesized from the same components as the neutral mixed esters (A)(1), and the description supra, of the dicarboxylic acid, polyol and monocarboxylic acid, starting materials made in reference to component (A)(1) is also applicable to the partial mixed esters (B)(1). However, the partial mixed esters (B)(1) differ from the netural mixed esters (A)(1) in that, on a statistical average, at least one free hydroxyl group is present per partial mixed ester molecule. The molar ratio of dicarboxylic acid to polyol is approximately $n-1:n$, where n is an integer of from 2 to 12. The molar number of monocarboxylic acid is selected so that generally no more than 6 and, in particular, no more than 4, free hydroxyl groups are present in the partial mixed ester (B)(1) molecule. Partial mixed esters (B)(1) containing on a statistical average from 1 to 3 free hydroxyl groups per molecule are preferred. The partial mixed esters (B)(1) containing free hydroxyl groups are obtainable by selecting the molar ratios of dicarboxylic acid, polyol, and monocarboxlyic acid so that, on a statistical average, the desired number of free functional groups remains unesterified during the esterification.

Particularly suitable partial mixed esters (B)(1) containing free hydroxyl groups and neutral mixed esters (A)(1) are derived from polyols containing from 3 to 5 carbon atoms and from 3 or 4 hydroxyl groups, more especially from glycerol and pentaerythritol. Preference is attributed to esters of these polyols with aliphatic dicarboxylic acids containing from 4 to 10 carbon atoms and aliphatic monocarboxylic acids containing from 14 to 20 carbon atoms, more especially from 16 to 18 carbon atoms, and, with the partial esters (B)(1), on a statistical average from 1 to 4 free hydroxyl groups per mixed ester molecule.

The partial esters (B)(2) are derived from aliphatic, cycloaliphatic, and aromatic $C_4$–$C_8$-polycarboxylic acid containing at least 3 carboxyl groups and from aliphatic, cycloaliphatic and aromatic $C_4$–$C_8$-hydroxypolycarboxylic acids containing at least 2 carboxyl groups and at least 1 hydroxyl group. Examples of suitable acids in this category are aconitic acid, cyclobutane tetracarboxylic acid, trimetllitic acid, trimesic acid, hexahydromellitic acid, mellitic acid, tartronic acid, malic acid, tartaric acid, citric acid and hydroxytrimesic acid. Suitable as alcohol component for the esters (B)(2) are, for example, lauryl alcohol, myristyl alcohol, palmityl alcohol, stearyl alcohol, arachidyl alcohol, behenyl alcohol, lignoceryl alcohol, oleyl alcohol and erucyl alcohol, and also mixtures of $C_{12}$–$C_{24}$ alcohols of the type which are obtainable by known methods of producing fatty alcohols from natural fats and oils.

The esters (B)(2) containing free carboxyl and/or hydroxyl groups are readily prepared by reaction of the components in the proposed molar ratios under the conditions of known esterification processes.

A preferred component (B)(2) containing free carboxyl grups is distearyl trimellitate, a partial ester obtainable by reaction of 1 mole trimellitic acid with 2 moles stearyl alcohol. A preferred component (B)(2) containing free carboxyl and free hydroxyl groups is distearyl citrate obtained by esterification of citric acid with stearyl alcohol in a molar ratio of 1:2.

Suitable metal soaps (II) having a lubricating and/or stabilizing effect are, in particular, metal soaps highly compatible in PVC which counteract over-lubrication and which additionally improve the hydrophilicity of the lubricant system as a whole. Suitable metal soaps are, in particular, salts of organic acids with metals belonging to Groups IIA and IIB of the periodic system. Particular significance is attributed to alkaline-earth metal soaps, particularly barium, and especially calcium soaps. However, corresponding zinc and/or cadmium soaps are also suitable.

Metal soaps which themselves form clear melts and which, in particular, dissolve clearly in the metls of the esters (A)(1), (A)(2), (B)(1) and/or (B)(2) are preferably used as component II. Metal soaps which fulfill these conditions shows a far smaller tendency to haze the finished films than, for exmaple, other known metal soaps such as calcium stearate. In this connection, salts of $C_{10}$–$C_{35}$-acylated hydroxycarboxylic acids which contain in all at least 10 and preferably 15 carbon atoms in each of the acid residues are particularly suitable as component II. The hydroxycarboxylic acid may also be a lower hydroxy carobxylic acid, for example containing from 2 to 5 carbon atoms, such as lactic acid; in this case, the preferred minimum number of total carbon atoms (15) is introduced through the carboxylic acid used to acylate the hydroxyl group acylating carboxylic acid residues containing from 10 to 30 carbon atoms, and more especially from 14 to 24 carbon atoms, being preferred. The observations made supra in connection with component (A)(1) on the monocarboxylic acid reactants also apply to these acylating carboxylic acid residues. Hydroxycarboxylic acid oligomers acylated in the free hydroxyl group and having a degree of oligomerization of from 2 to 10, and more especially from 2 to 4, are often particularly suitable; the same or different hydroxycarboxylic acids may be present. A particularly suitable class of compounds II are calcium salts of acylated lactic acid estolides.

In general, from 0.2 to 4 parts by weight of components (B)(1) and/or (B)(2) and, optionally, from 0.2 to 2 parts by weight of component II metal soap are present to 1 part by weight of component(s) (A)(1) and/or (A)(2) in the lubricant mixture according to the invention. From 0.4 to 0.6 part by weight of component(s) (B)(1) and/or (B)(2) and, optionally, from 0.4 to 0.6 part by weight of component II are preferably present to 1 part by weight of component(s) (A)(1) and/or (A)(2) in the mixtures. Component (A)(2) is typically used as the sole component of section (A) in exceptional cases for obtaining special effects. Where component(s) (A)(1) and (A)(2) are present at the same time, the ratio by weight of (A)(1) to (A)(2) is from 1:0.1 to 1:1. In cases where components (B)(1) and (B)(2) are present at the same time, the ratio by weight of (B)(1) to (B)(2) is from 9:1 to 1:9.

The lubricant combination according to the invention is suitable for the production of films or rigid emulsion PVC, for example having K-values of from 70 to 80, and more especially for the production of unplasticized films.

The lubricant mixtures according to the invention may be incorporated into the PVC materials without difficulty, even in comparatively large quantities, especially in quantities of from 4 to 6 phr. The rheological requirements imposed by the forming process are satisfactorily fulfilled. The resulting rigid PVC films satisfy all practical requirements, particularly in regard to wettability with aqueous solutions.

Particular advantages of the lubricant system according to the invention lie in the fact that, by careful modification and choice of the components (A)(1), (A)(2), (B)(1), (B)(2) and II, it is possible to influence parameters of the production process and/or of the properties of the end product. For example, it is possible to vary the properties of the end product according to requirements by variation of the chain length of the fatty acids used in component (A)(1), (A)(2), (B)(1) and II, or by variation of the chain length of the fatty alcohols in components (A)(2) and (B)(2). Higher compatibility of the individual components and/or of the mixture as a whole with PVC may be obtained by shortening the chain length of the fatty acid or fatty alcohol residues. If greater lubrication is required, it may conversely be achieved by introduction of relatively long-chain fatty acid or fatty alcohol residues. Lubricant mixtures developing optimal effects on the properties of the PVC films may be prepared by suitable combinations of fatty acid and/or fatty alcohol residues. Another way of influencing the properties of the end products is, for example, by varying the molecular weight of the multicomponent esterse (A)(1) and (B)(1). For example, it is usually possible to obtain a greater release effect by using multicomponent esters of relatively high molecular weight, i.e. esters wherein n is equal to or greater than 6.

EXAMPLES

EXAMPLE A

Production of Distearyl Trimellitate 192 g (1 mole) trimellitic acid anhydride, 520 g (2 moles) technical stearyl alcohol and 1.4 g tin powder were heated with stirring under a light vacuum to 200° C. and kept at that temperature for 2 hours. Towards the end of the reaction, the pressure was reduced to 19 mbar. 3.5 g bleaching earth and 3.5 g active carbon were added to the almost clear, reddish-yellow reaction mixture which was then filtered under pressure at a temperature of 80 to 90° C. After cooling, the distearyl trimellitic was present as a yellowish wax-like mass (dropping point 52.0° C.; acid number 58.0; saponification number 236.7; hydroxyl number<0.1).

EXAMPLE B

Production of Distearyl Citrate 192 g (1 mole) citric acid and 520 g (2 moles) technical stearyl alcohol were heated with stirring under a light vacuum (0.5 to 0.7 bar) to 150° C. and kept at that temperature for 1.5 hours. 3.5 g bleaching earth and 3.5 g active carbon were added to the clear, pale yellow reaction mixture which was then filtered under pressure at 80° to 90° C. After cooling, the distearyl citrate was present in the form of a slightly brittle, wax-like, slightly yellow-tinged mass (dropping point 45.8° C.; acid number 77.2; saponification number 249.7; hydroxyl number 60.8).

EXAMPLE 1

The following lubricant mixtures A" to F" according to the invention were prepared by mechanically mixing the individual constituents (pbw—parts by weight; the ratios shown after the product names are the molar ratios of the starting materials in the order reflected in the name):

Mixture A'
50 pbw pentaerythritol adipate behenate (2:1:6)
25 pbw glycerol adipate stearate (2:1:2)
25 pbw Ca—stearoyl lactoyl lactate
Mixture B'
50 pbw pentaerythritol adipate behenate (2:1:6)
25 pbw glycerol adipate stearate (2:1:2)
25 pbw Ca—lauroyl hydroxystearoyl hydroxystearate
Mixture C'
50 pbw pentaerythritol adipate behenate (2:1:6)

-continued 25 pbw glycerol adipate stearate (2:1:2)
25 pbw Zn—stearoyl lactoyl lactate
Mixture D'
50 pbw pentaerythritol adipate behenate (2:1:6)
25 pbw glycerol adipate stearate (2:1:2)
25 pbw Zn—lauroyl hydroxystearoyl hydroxystearate
Mixture E'
50 pbw sorbitol adipate behenate (3:2:14)
25 pbw glycerol adipate stearate (2:1:2)
25 pbw Ca—stearoyl lactoyl lactate
Mixture F'
50 pbw dipentaerythritol adipate behenate (3:2:14)
25 pbw glycerol adipate stearate (2:1:2)
25 pbw Ca—stearoyl lactoyl lactate Each of the lubricant mixtures described above was mixed in quantities of 2, 4 and 6 phr with a basic formulation of:
100 pbw emulsion PVC, K-value 78 (Hostalit ™ E 2078)
0.5 bpw diphenyl thiourea
to form molding compositions A 1 to G 3, wherein the compositions "A" through "G" contain the corresponding lubricant mixtures A'-G'; and the compositions 1, 2, and 3 contain 2, 4, and 6 phr lubricant mixture, respectively.

The plasticizing behavior of the molding compositions obtained was tested by means of a plastograph (Brabender Plasticoder PL 151, as described by P. Klenk, in Der Plastverarbeiter, Vol. 21 (1970), pp. 642–644. The chamber temperature was 180° C., the rotational speed 50 r.p.m. All the tests were carried out on 33 g of material.

2, 4, and 6 phr montan wax (Hoechst-Wachs ™ E) (material Y') and stearyl stearate (material Z') were similarly used for comparison in molding compositions Y and Z, respectively.

The results obtained are set out in Table 1 below which shows for each molding composition the plasticizing time, the maximum kneading resistance, the kneading resistance 15 minutes after reaching the maximum and the melt temperature 15 minutes after reaching the maximum. The difference between the values for the kneading resistance 15 minutes after reaching the maximum for 2 and 6 phr is shown in the 6th column for each lubricant or lubricant mixture. The difference between the values for the melt temperature 15 minutes after reaching the maximum kneading resistance for additions of 2 and 6 phr is shown for each lubricant in the last column.

APPENDIX

Sources of the commercial products used in the Examples is as follows:
Hostalit E 2078: Hoechst Aktiengesellschaft, Technische Kunststoffe, Frankfurt/Main, Germany
Hoechst-Wachs E: Hoechst Aktiengesellschaft, Verkauf Kunststoffe, Gruppe Wachse und Kunststoff-Additive, Gersthofen, Augsburg, Germany.

TABLE 1

Plasticizing behavior of molding compositions A 1 to F 3

| Molding Composition | Addition phr | Plasticizing time (mins.) | Kneading resistance (Nm sec$^{-1}$) maximum | 15 mins. after maximum | $\Delta$(Nm sec$^{-1}$) for 2-6 phr | Melt temperature 15 mins. after maximum | $\Delta$(°C.) for 2-6 phr |
|---|---|---|---|---|---|---|---|
| A 1 | 2 A' | 0 | 30.0 | 18.3 | 6.8 | 185.0 | 11.2 |
| A 2 | 4 A' | 0 | 22.0 | 15.2 | | 179.5 | |
| A 3 | 6 A' | 0.1 | 18.0 | 11.5 | | 173.8 | |

TABLE 1-continued

Plasticizing behavior of molding compositions A 1 to F 3

| Molding Composition | Addition phr | Plasticizing time (mins.) | Kneading resistance (Nm sec$^{-1}$) maximum | 15 mins. after maximum | $\Delta$(Nm sec$^{-1}$) for 2–6 phr | Melt temperature 15 mins. after maximum | $\Delta$(°C.) for 2–6 phr |
|---|---|---|---|---|---|---|---|
| B 1 | 2 B' | 0 | 24.0 | 17.2 | 5.9 | 184.0 | 10.7 |
| B 2 | 4 B' | 0 | 21.0 | 14.0 | | 177.1 | |
| B 3 | 6 B' | 0.3 | 16.2 | 11.3 | | 173.3 | |
| C 1 | 2 C' | 0 | 27.5 | 17.8 | 6.2 | 184.0 | 10.0 |
| C 2 | 4 C' | 0.2 | 22.0 | 14.8 | | 178.5 | |
| C 3 | 6 C' | 0.6 | 16.8 | 11.6 | | 174.2 | |
| D 1 | 2 D' | 0 | 26.0 | 18.0 | 7.5 | 187.5 | 14.0 |
| D 2 | 4 D' | 0 | 20.5 | 13.7 | | 179.0 | |
| D 3 | 6 D' | 0.2 | 16.7 | 10.5 | | 173.5 | |
| E 1 | 2 E' | 0 | 23.0 | 15.2 | 6.2 | 181.0 | 10.0 |
| E 2 | 4 E' | 0.1 | 19.0 | 12.0 | | 174.7 | |
| E 3 | 6 E' | 0.2 | 15.0 | 9.0 | | 171.0 | |
| F 1 | 2 F' | 0 | 26.2 | 16.2 | 7.4 | 181.0 | 11.0 |
| F 2 | 4 F' | 0 | 20.0 | 12.6 | | 174.8 | |
| F 3 | 6 F' | 0.3 | 16.1 | 8.8 | | 170.0 | |
| Y 1 | 2 Y' | 0 | 23.3 | 16.5 | 7.5 | 182.4 | 11.1 |
| Y 2 | 4 Y' | 0.1 | 19.0 | 12.2 | | 175.5 | |
| Y 3 | 6 Y' | 0.2 | 15.7 | 9.0 | | 171.2 | |
| Z 1 | 2 Z' | | 21.5 | 17.9 | 10.8 | 184.5 | 14.7 |
| Z 2 | 4 Z' | | 16.0 | 12.8 | | 176.0 | |
| Z 3 | 6 Z' | | 8.0 | 7.1 | | 169.8 | |

Each of the lubricant mixtures described above was mixed in quantities of 2, 4 and 6 phr with a basic formulation of
100 pbw emulsion PVC, K-value 78 (Hostalit ™ E 2078)
0.5 pbw diphenyl thiourea
to form molding compositions G 1 to I 3, wherein the compositions "G" through "I" contain the corresponding lubricant mixtures "G'" through "I'", and the compositiosn "1," "2" and "3" contain 2, 4, and 6 phr lubricant mixture, respectively.

The plasticizing behavior of the molding compositions obtained was tested using the plastograph described in Example 1. The chamber temperature was 165° C. and the rotational speed 30 r.p.m. All the tests were carried out on 33 g of material.

2, 4 and 6 phr montan wax (Hoechst-Wachs ™ E) (material Y') was similarly tested for comparison in molding composition Y.

The results obtained are shown in Table 2 below. The explanations of Table 1 also apply to Table 2.

TABLE 2

Plasticizing behavior of molding compositions G 1 to I 3

| Molding composition | Addition phr | Plasticizing time (mins.) | Kneading resistance (Nm sec$^{-1}$) maximum | 15 mins. after maximum | $\Delta$(Nm sec$^{-1}$) for 2–6 phr | Melt temperature 15 mins. after maximum | $\Delta$(°C.) for 2–6 phr |
|---|---|---|---|---|---|---|---|
| G 1 | 2 G' | 0 | 25.2 | 19.9 | 7.1 | 168.1 | 10.1 |
| G 2 | 4 G' | 0.8 | 20.0 | 16.8 | | 162.3 | |
| G 3 | 6 G' | 1.1 | 16.4 | 12.8 | | 158.0 | |
| H 1 | 2 H' | 0 | 30.0 | 19.8 | 8.0 | 166.5 | 9.7 |
| H 2 | 4 H' | 0 | 22.2 | 16.2 | | 160.8 | |
| H 3 | 6 H' | 0.1 | 19.0 | 11.8 | | 156.8 | |
| I 1 | 2 I' | 0 | 28.8 | 19.4 | 7.9 | 166.2 | 10.4 |
| I 2 | 4 I' | 0.6 | 20.5 | 15.8 | | 159.8 | |
| I 3 | 6 I' | 0.2 | 16.8 | 11.5 | | 155.8 | |
| Y 1 | 2 Y' | 0 | 25.0 | 19.0 | 8.2 | 166.5 | 9.8 |
| Y 2 | 4 Y' | 0.6 | 18.8 | 15.0 | | 161.0 | |
| Y 3 | 6 Y' | 0.8 | 15.0 | 10.8 | | 156.7 | |

EXAMPLE 3

Molding compositions K 1 to K 3 according to the invention and comparison molding compositions Z 1 to Z 3 were prepared by mechanically mixing a basic formulation of
100 pbw emulsion PVC, K-value 78 (Hostalit ™ E 2078)
0.5 pbw diphenyl thiourea
with quantities of 2, 4 and 6 phr of mixture A' from Example 1 and 2, 4 and 6 phr stearyl stearate, respectively.

Quantities of 200 g of the molding compositions obtained in this way were processed on laboratory mixing rolls (berstorff) measuring 450×220 mm at a roll temperature of 180° C. and the stress load (t) occuring in the nip of the rolls was measured as a function of the roll speed (r.p.m.) or peripheral speed (m/min.). The results obtained for molding compositions K 1, K 2, K 3 and Z 1 are shown in the form of a graph in the Figure. No stress load curves could be recorded for molding compositions Z 2 and Z 3 because no sheet formation occurred in their case through overlubrication.

We claim:
1. A lubricant system for emulsion polyvinyl chloride of high K-value comprising
at least one ester from each of sections (A) and (B):
  A. a neutral ester substantially free from hydroxyl and carboxyl groups which is:

(1) a mixed ester of an aliphatic, cycloaliphatic, or aromatic $C_2$–$C_{22}$-dicarboxylic acid, or a mixture thereof; an aliphatic polyol containing from 2 to 6 hydroxyl groups; and an aliphatic $C_{12}$–$C_{30}$-monocarboxylic acid; or is (2) a fatty acid fatty alcohol ester containing a total of 36 to 44 carbon atoms; or is (3) a mixture of (1) and (2); and B. a partial ester containing on average at least one free hydroxyl or carboxyl group which is:

(1) a mixed ester of an aliphatic, cycloaliphatic, or aromatic $C_2$–$C_{22}$-dicarboxylic acid, or a mixture thereof; and aliphatic polyol containing from 2 to 6 hydroxyl groups; and an aliphatic $C_{12}$–$C_{30}$-monocarboxylic acid; said ester containing an average at least one hydroxyl grup per molecule of mixed ester; or is (2) an ester of an aliphatic, cycloaliphatic, or aromatic polycarboxylic acid or an aliphatic, cycloaliphatic or aromatic hydroxycarboxylic acid, or a mixture thereof; and an aliphatic $C_{12}$–$C_{24}$-monohydric alcohol; said ester containing on average at least one hydroxyl or carboxyl group per molecule of ester; or is (3) a mixture of (1) and (2).

2. The lubricant system of claim 1, wherein the molar ratio of dicarboxylic acid to polyol to monocarboxylic acid in the neutral mixed ester defined in Section (A), paragraph (1) is approximately $n-1:n:nm-2(n-1)$, where n is an integer of from 2 to 11 and m is the number of hydroxyl groups of the polyol.

3. The lubricant of claim 2, wherein n is from 1 to 8.

4. The lubricant of claim 3, wherein n is from 1 to 4.

5. The lubricant of claim 1, wherein in the mixed esters (A)(1) and (B)(1), the dicarboxylic acid component is an aliphatic dicarboxylic acid containing from 4 to 10 carbon atoms; the polyol component contains from 3 to 5 carbon atoms and from 3 to 4 hydroxyl groups; and the monocarboxylic acid component contains from 14 to 20 carbon atoms.

6. The lubricant system of claim 5, wherien the monocarboxylic acid component contains from 16 to 18 carbon atoms.

7. The lubricant system of claim 5, wherein the partial mixed ester (B)(1) contains on a statistical average from 1 to 4 free hydroxyl groups per mixed ester molecule.

8. The lubricant system of claim 1, wherein component (A)(1) is a mixed ester of adipic acid, pentaerythritol, and an aliphatic monocarboxylic acid containing from 20 to 24 carbon atoms.

9. The lubricant system of claim 8, wherein in component (A)(1), pentaerythritol and adipic acid are reacted in proportion of 2 moles to 1.

10. The lubricant system of claim 1, wherein in the fatty acid fatty alcohol ester (A)(2), the fatty acid and fatty alcohol each contain from 14 to 22 carbon atoms.

11. The lubricant system of claim 1, wherein the molar ratio of dicarboxylic acid to polyol in the partial mixed ester defined in section (B), paragraph (1) is about $n-1:n$, wherein n is from 2 to 12.

12. The lubricant system of claim 11, wherein the partial mixed ester (B)(1) contains on a statistical average from 1 to 3 free hydroxyl groups per mixed ester molecule.

13. The lubricant system of claim 1 wherein component (B)(1) is a partial mixed ester derived from a polyol containing no more than 6 hydroxyl groups.

14. The lubricant system of claim 13, wherein the polyol component of the ester of (B)(1) is glycerol or pentaerythritol.

15. The lubricant system of claim 1, wherein in the partial ester component (B)(2), the polycarboxylic acid contains at least 3 carboxyl groups and the hydroxycarboxylic acid contains at least 2 carboxyl groups and 1 hydroxyl group.

16. The lubricant system of claim 15, wherein the partial ester component (B)(2) is distearyl trimellitate or distearyl citrate.

17. The lubricant system of claim 1, wherein the component II metal soap is a salt of an organic acid with a metal from Group II of the periodic system.

18. The lubricant system of claim 17, wherein the metal is zinc, calcium, or barium, and the organic acid is an acylated hydroxycarboxylic acid containing at least 10 carbon atoms.

19. The lubricant system of claim 1, wherein component II is a salt of an acylated oligomer of a hydroxycarboxylic acid.

20. The lubricant system of claim 19, wherein the salts of an acylated oligomer of the hydroxycarboxylic acid is the calcium salt of an acylated lactic acid estolide.

21. The lubricant system of claim 1, wherein from 0.2 to 4 parts by weight of component(s) (B)(1) and (B)(2), and, optionally, from 0.2 to 2 parts by weight of component II, to 1 parts by weight of components (A)(1) and (A)(2) are present.

22. The lubricant system of claim 1, wherein from 0.4 to 0.6 parts by weight of component(s) (B)(1) and (B)(2), optionally, from 0.4 to 0.6 parts by weight of component II, to 1 part by weight of component(s) (A)(1) and (A)(2), are present.

23. The lubricant system of claim 1, wherein, where components (A)(1) and (A)(2) are both present, the ratio of weight of (A)(1) to (A)(2) is from about 1:0.1 to 1:1.

24. The lubricant system of claim 1, wherein, where components (B)(1) and (B)(2) are both present, the ratio by weight of (B)(1) to (B)(2) is from about 9:1 to 1:9.

25. The lubricant system of claim 1 wherein the system also contains a metal soap in an amount sufficient to lubricate or stabilize the polyvinyl chloride.

* * * * *

UNITED STATES PATENT AND TRADEMARK OFFICE
CERTIFICATE OF CORRECTION

PATENT NO. : 4,857,216

DATED : August 15, 1989

INVENTOR(S) : Worsehech et al.

It is certified that error appears in the above-identified patent and that said Letters Patent is hereby corrected as shown below:

In Claim 1, at Col. 11, line 13, "and" should read --an--.

In Claim 1, at Col. 11, line 16, "an" should read --on--.

In Claim 1, at Col. 11, line 17, "grup" should read --group--.

In Claim 3, at Col. 11, line 33, after "lubricant" add --system--.

In Claim 4, at Col. 11, line 34, after "lubricant" add --system--.

In Claim 5, at Col. 11, line 35, after "lubricant" add --system--.

Signed and Sealed this

Twenty-ninth Day of January, 1991

Attest:

HARRY F. MANBECK, JR.

*Attesting Officer*  *Commissioner of Patents and Trademarks*